US 6,674,413 B2

(12) United States Patent
Inoue et al.

(10) Patent No.: US 6,674,413 B2
(45) Date of Patent: Jan. 6, 2004

(54) DISPLAY CONTROL APPARATUS

(75) Inventors: Masao Inoue, Katano (JP); Keiji Kawashima, Takatsuki (JP); Masayuki Nakaimuki, Toyonaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 277 days.

(21) Appl. No.: 09/820,326

(22) Filed: Mar. 29, 2001

(65) Prior Publication Data
US 2001/0026250 A1 Oct. 4, 2001

(30) Foreign Application Priority Data

Mar. 30, 2000 (JP) ........................................ 2000-093160

(51) Int. Cl.$^7$ ................................................ G09G 3/32
(52) U.S. Cl. ............................. 345/22; 345/30; 345/46; 345/48; 345/204; 345/690
(58) Field of Search ............................. 345/22, 30, 46, 345/48, 204, 690

(56) References Cited

U.S. PATENT DOCUMENTS

| | | | | |
|---|---|---|---|---|
| 4,737,772 A | * | 4/1988 | Nishi et al. .................. 345/603 |
| 5,006,732 A | * | 4/1991 | Nakamura ..................... 326/58 |
| 5,642,127 A | | 6/1997 | Tamai |
| 5,666,129 A | * | 9/1997 | Wurster et al. ................ 345/83 |
| 5,936,901 A | * | 8/1999 | Wong et al. .................. 365/201 |
| 6,148,398 A | * | 11/2000 | Chang et al. ................... 713/1 |
| 6,239,776 B1 | * | 5/2001 | Havel ........................... 345/83 |

FOREIGN PATENT DOCUMENTS

| | | |
|---|---|---|
| JP | 7-79475 | 8/1987 |
| JP | 62-180691 A | 8/1987 |
| JP | 8-54602 | 2/1996 |
| JP | 11-007272 A | 1/1999 |

* cited by examiner

Primary Examiner—Bipin Shalwala
Assistant Examiner—Vincent E. Kovalick
(74) Attorney, Agent, or Firm—Parkhurst & Wendel, L.L.P.

(57) ABSTRACT

A display control apparatus includes at least one output control unit, and each output control unit comprises: a tri-state buffer receiving, as a signal input, a one-bit color signal, and receiving, as a control input, a one-bit intermediate color control signal for controlling an intermediate color of the color signal, and setting its output in one of the following three states: a state of outputting a first voltage, a state of outputting a second voltage, and a high impedance state, on the basis of the color signal and the intermediate color control signal; a first resistor having an end connected to a power supply, and the other end connected to the output of the tri-state buffer; and a second resistor having an end connected to the ground, and the other end connected to the output of the tri-state buffer. Therefore, it is possible to provide a display control apparatus that is able to perform intermediate color display, with reduced manufacturing cost and reduced power consumption.

5 Claims, 3 Drawing Sheets

DISPLAY CONTROL APPARATUS

FIELD OF THE INVENTION

The present invention relates to a display control apparatus for displaying data having gradations on a display unit such as a CRT (Cathode Ray Tube) or the like.

BACKGROUND OF THE INVENTION

In recent years, in order to display various kinds of information such as channels, volumes, and the like as characters or graphics on a display unit such as a CRT or the like, a display control apparatus is employed in a television set or the like. This display control apparatus reads display data stored in a ROM in order of display codes stored in a RAM, converts the display data into RGB display data, further converts the RGB display data into analog RGB data having halftones by a DAC (Digital Analog Converter), and displays the analog RGB data on a display unit.

FIG. 3 is a block diagram illustrating a display control apparatus using a conventional technique. A main unit 300 of the display control apparatus displays display data stored in it, on a display unit 110 such as a CRT, on the basis of a display command S101 supplied from the outside. The display command S101, which is a signal instructing to carry out display, is input to a display command input terminal 101. A CPU (Central Processing Unit) 102 generates a display code S102 on the basis of the display command S101 inputted to the display command input terminal 101. The display code S102 is a signal corresponding to display data to be displayed. For example, when displaying a character on the display unit 110, an ASCII code or the like is used as the display code, and the display data corresponding to this display code is bit map data of the character, or the like. The display codes S102 generated by the CPU 102 are sequentially arranged and stored in a RAM 103. An address generation controller 104 sequentially reads the display codes S103 arranged in the RAM 103 and performs arithmetic operation on them to convert the display data into ROM addresses S104 of a ROM 105 which stores the display data. The ROM 105 outputs the display data S105 at an address position on the basis of a given ROM address S104. The display data S105 is a 5-bit signal, and it is used to specify 27 display colors to be converted in a color data conversion unit 306. In the color data conversion unit 306, a code of a color pallet used to control a DAC 207 is stored. The color data conversion unit 306 converts the 5-bit display data S105 for specifying the display colors into display color control signals S306a, S306b, and S306c for specifying the display colors of R(Red), G(Green), and B(blue) each comprising 2 bits, on the basis of the color pallet, and outputs these signals. A display control preprocessing unit 350 is composed of the CPU 102, the RAM 103, the address generation controller 104, the ROM 105, and the color data converter 106.

The DAC 207 is a current output type DAC receiving the display color control signals S306a, S306b, and S306c corresponding to R, G, and B each having 2 bits, which are output from the display of the display control preprocessing unit 350. The DAC 207 comprises a DACR 217 corresponding R, a DACG 227 corresponding to G, and a DACB 237 corresponding to B, and grounding resistors RR3, RG3, and RB3 which are connected to the outputs of the DACR 217, the DACG 227, and the DACB 237, respectively, to convert current into voltage. The DACR 217, the DACG 227, and the DACB 237 perform control of three current outputs of H (high) level, M (Middle) level, and L (low) level, on the basis of the values of the 2-bit display color control signals S306a, S306b, and S306c, respectively, and the current outputs are converted into three voltage levels of H, M, and L, thereby outputting display color data S107a, S107b, and S107c that can be displayed by the display unit 108.

In the display control apparatus 300 so constructed, when each of the three display color data S107a, S107b, S107c represents the three signal levels, 27 (=3×3×3) states are generated, whereby 27 colors can be displayed. Each of the current output type DACs, i.e., the DACR 217, DACG 227, and DACB 237, is able to control the current outputs of three levels H, M, L, according to the inputted 2-bit display color control signal and, therefore, 27 (=3×3×3) voltage states are realized by the resistors RR3, RG3, and RB3 that convert current into voltage.

However, the conventional display control apparatus 300 employs the current output type DACs that are analog circuits. Generally, in contrast with a digital circuit, the characteristics of an analog circuit greatly vary according to the size of a transistor or the capacitance of a capacitor, which are constituents of the analog circuit. Therefore, the manufacturing precision must be kept high to obtain products of uniform quality. Further, the power consumption is increased. Consequently, the conventional display control apparatus has the problems of high manufacturing cost and large power consumption.

SUMMARY OF THE INVENTION

The present invention is made to solve the above-described problems and has for its object to provide a display control apparatus that can perform intermediate color display, with reduced manufacturing cost and reduced power consumption.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a display control apparatus including at least one output control unit, and each output control unit comprises: a tri-state buffer receiving, as a signal input, a one-bit color signal, and receiving, as a control input, a one-bit intermediate color control signal for controlling an intermediate color of the color signal, and setting its output in one of the following three states: a state of outputting a first voltage, a state of outputting a second voltage, and a high impedance state, on the basis of the color signal and the intermediate color control signal; a first resistor having an end connected to a power supply, and the other end connected to the output of the tri-state buffer; and a second resistor having an end connected to the ground, and the other end connected to the output of the tri-state buffer. Therefore, it is possible to provide a display control apparatus that can perform output for intermediate color display, with reduced manufacturing cost and reduced power consumption, by using the tri-state buffer as a digital circuit.

According to a second aspect of the present invention, the display control apparatus of the first aspect includes, as the output control units, an output control unit to which an R color signal is input, an output signal unit to which a G color signal is input, and an output control unit to which a B color signal is input. Therefore, it is possible to provide a display control apparatus that can perform output for intermediate color display, with reduced manufacturing cost and reduced power consumption.

According to a third aspect of the present invention, the display control apparatus of the first aspect including a plurality of the output control units, and the respective output control units receive intermediate color control signals which are independent of one another. Therefore, it is possible to provide a display control apparatus that can perform output for intermediate color display, with reduced manufacturing cost and reduced power consumption.

According to a fourth aspect of the present invention, in the display control apparatus of the first aspect, the output control unit further includes a switch between the power supply and the first resistor, which switch electrically connects the power supply and the first resistor when the color signal and the intermediate color control signal are input to the output control unit, and electrically disconnects the power supply and the first resistor when the color signal and the intermediate color control signal are not input to the output control unit. Therefore, it is possible to provide a display control apparatus that can reduce unnecessary power consumption.

According to a fifth aspect of the present invention, in the display control apparatus of the first aspect, the output control unit further includes a switch between the ground and the second resistor, which switch electrically connects the ground and the second resistor when the color signal and the intermediate color control signal are input to the output control unit, and electrically disconnects the ground and the second resistor when the color signal and the intermediate color control signal are not input to the output control unit. Therefore, it is possible to provide a display control apparatus that can reduce unnecessary power consumption.

DETAILED DESCRIPTION OF THE PREFERRED EMBODIMENTS

[Embodiment 1]

Figure 1:
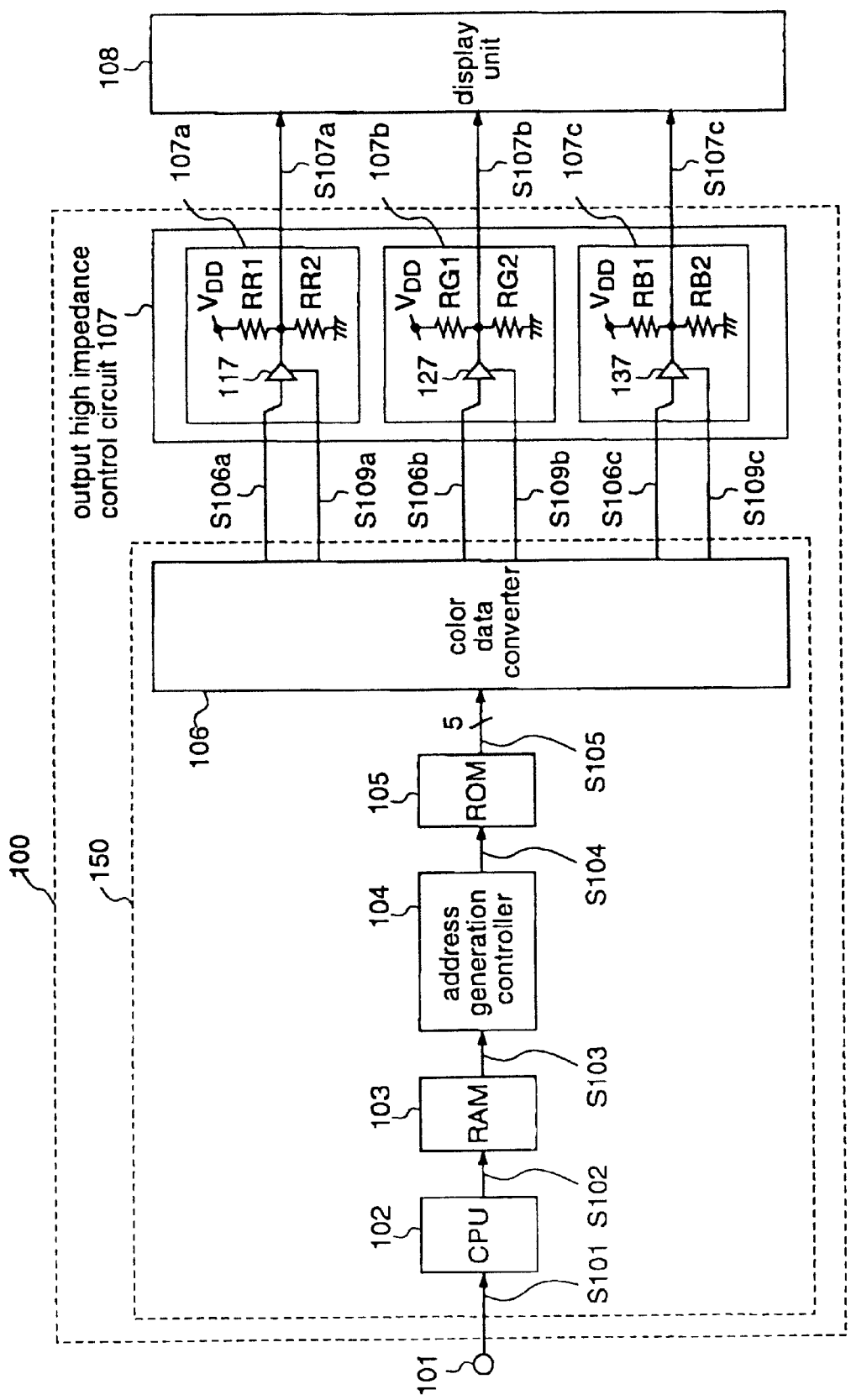
FIG. 1 is a block diagram illustrating the construction of a display control apparatus according to a first embodiment of the present invention.

FIG. 1 is a block diagram illustrating the construction of a display control apparatus 100 according to a first embodiment of the present invention. The display control apparatus 100 comprises a display control preprocessing unit 150 and an output high impedance control circuit 107.

In the display control preprocessing unit 150, a display command S101, which is a signal instructing the unit 150 to perform display, is input to a display command input terminal 101. A CPU 102 generates a display code S102, on the basis of the display command S101 inputted to the display command input terminal 101. The display code S102 is a signal corresponding to display data to be displayed. For example, when displaying a character on a display unit 108, an ASCII code or the like is used as the display code, and the display data corresponding to this code is bit map data of the character, or the like. The display codes S102 obtained in the CPU 102 are sequentially arranged and stored in a RAM 103. An address generation controller 104 sequentially reads the display codes S103 arranged in the RAM 103, and performs arithmetic operation on the display codes S103 to convert them into ROM addresses S104 of a ROM 105 which stores the display data. The ROM 105 outputs the display data S105 at an address position on the basis of a given ROM address S104. In this first embodiment, the display data S105 is a 5-bit signal, and it is used to specify 27 display colors to be converted in a color data converter 106. The color data converter 106 converts the 5-bit display data S105 to specify the display colors into 1-bit color signals S106a, Sl06b, and S106c corresponding to R, G, and B, respectively, and intermediate color control signals S109a, S109b, and S109c for controlling intermediate colors of the color signals S106a, S106b, and S106c, and outputs these signals. The display control preprocessing unit 150 is composed of the CPU 102, the RAM 103, the address generation controller 104, the ROM 105, and the color data converter 106.

The output high impedance control circuit 107 is provided with output controllers 107a, 107b, and 107c corresponding to the respective colors of R, G, and B. The output controllers 107a, 107b, and 107c are provided with high impedance control tri-state buffers 117, 127, and 137, resistors RR1, RG1, and RB1, and resistors RR2, RG2, and RB2, respectively. The tri-state buffers 117, 127, and 137 receive, as signal inputs, the 1-bit color signals S106a, S106b, and S106c corresponding to R, G, and B, respectively, and outputted from the color data converter 106, and receive, as control inputs, the intermediate color control signals S109a, S109b, and S109c corresponding to R, G, and B, respectively. The resistors RR1, RG1, and RB1 have first terminals connected to the outputs of the tri-state buffers 117, 127, and 137, respectively, and second terminals connected to a power supply $V_{DD}$. The resistors RR2, RG2, and RB2 have first terminals connected to the outputs of the tri-state buffers 117, 127, and 137, respectively, and second terminals being grounded. The outputs S107a, S107b, and S107c of the tri-state buffers 117, 127, and 137 are output to the display unit 108 such as a CRT, as display color data of R, G, and B that can be displayed by the display unit 108. Each of the tri-state buffers 117, 127, and 137 controls three output states at H level, high-impedance level (hereinafter also referred to as "HiZ" as necessary), and L level, by the combination of the 1-bit signal input and the 1-bit control input. The resistors RR1 and RR2, the resistors RG1 and RG2, and the resistors RB1 and RB2 constitute series resistance division circuits, respectively.

Hereinafter, a description will be given of the operation of the output high impedance control circuit 170 in the display control apparatus 100 constructed as described above. When each of the three display color data S107a, S107b, and S107c represents three signal levels, 27 (=3×3×3) states are generated, whereby 27 colors can be displayed. The tri-state buffers 117, 127, and 137 receive the 1-bit intermediate color control signals (control inputs) and the 1-bit color signals (signal inputs), which are independently output from the color data converter 106 with respect to R, G, and B, respectively, and each of the tri-state buffers 117, 127, and 137 can control its output in three states of H level, HiZ level, and L level by combination of the control input and the signal input. When the outputs of the respective tri-state buffers 117, 127, and 137 are "H", the both ends of the division resistors RR1, RG1, and RB1 are set at H level, and H-level display color data S107a, S107b, and S107c are output. When the outputs of the tri-state buffers 117, 127, and 137 are "L", the both ends of the division resistors RR2, RG2, and RB2 are set at L level, and L-level display color data S107a, S107b, and S107c are output. When the outputs of the tri-state buffers 117, 127, and 137 are "HiZ", intermediate-level display color data S107a, S107b, and S107c are output, which data are divided according to the division resistances of the division resistors RR1 and RR2, RG1 and RG2, and RB1 and RB2, respectively. At this time, since the respective intermediate color control signals are independent of one another and the respective color signals are also independent of one another, the tri-state buffers 117, 127, and 137 are controlled independently. That is, the display color data of R, G, and B are independently controlled, whereby the number of colors to be displayed by the display unit 108 is 27 (=3×3×3).

As described above, in the display control apparatus 100 according to the first embodiment, since the display color data S107a, S107b, and S107b including the intermediate colors can be generated by using the high impedance control tri-state buffers 117, 127, and 137 as digital circuits, the circuit construction and the manufacturing process can be simplified, thereby providing an inexpensive display control apparatus with reduced cost of manufacturing. Further, since the tri-state buffers 117, 127, and 137 are digital circuits, the power consumption can be minimized.

While in this first embodiment the display control apparatus 100 is provided with the output controllers 107a, 107b, and 107c corresponding to R, G, and B, respectively, the number of the output controllers may be increased or decreased according to the number of display color data required by the display unit. Also in this case, the same effects as mentioned above are achieved. For example, when the colors to be displayed are only one of the three colors R, G, and B and its intermediate color, the number of the output controllers may be reduced to one.

[Embodiment 2]

Figure 2:
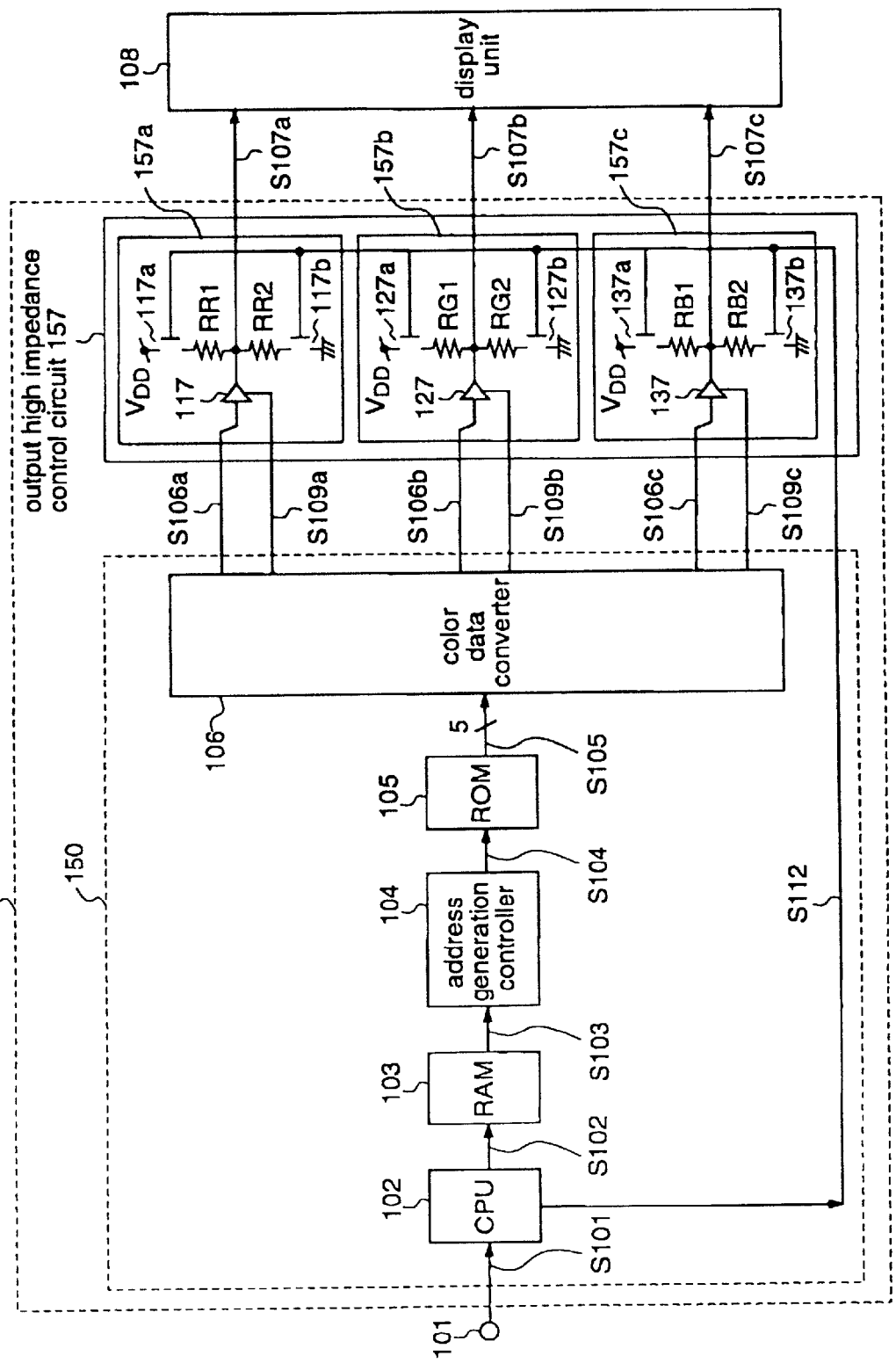
FIG. 2 is a block diagram illustrating the construction of a display control apparatus according to a second embodiment of the present invention.
Figure 3:
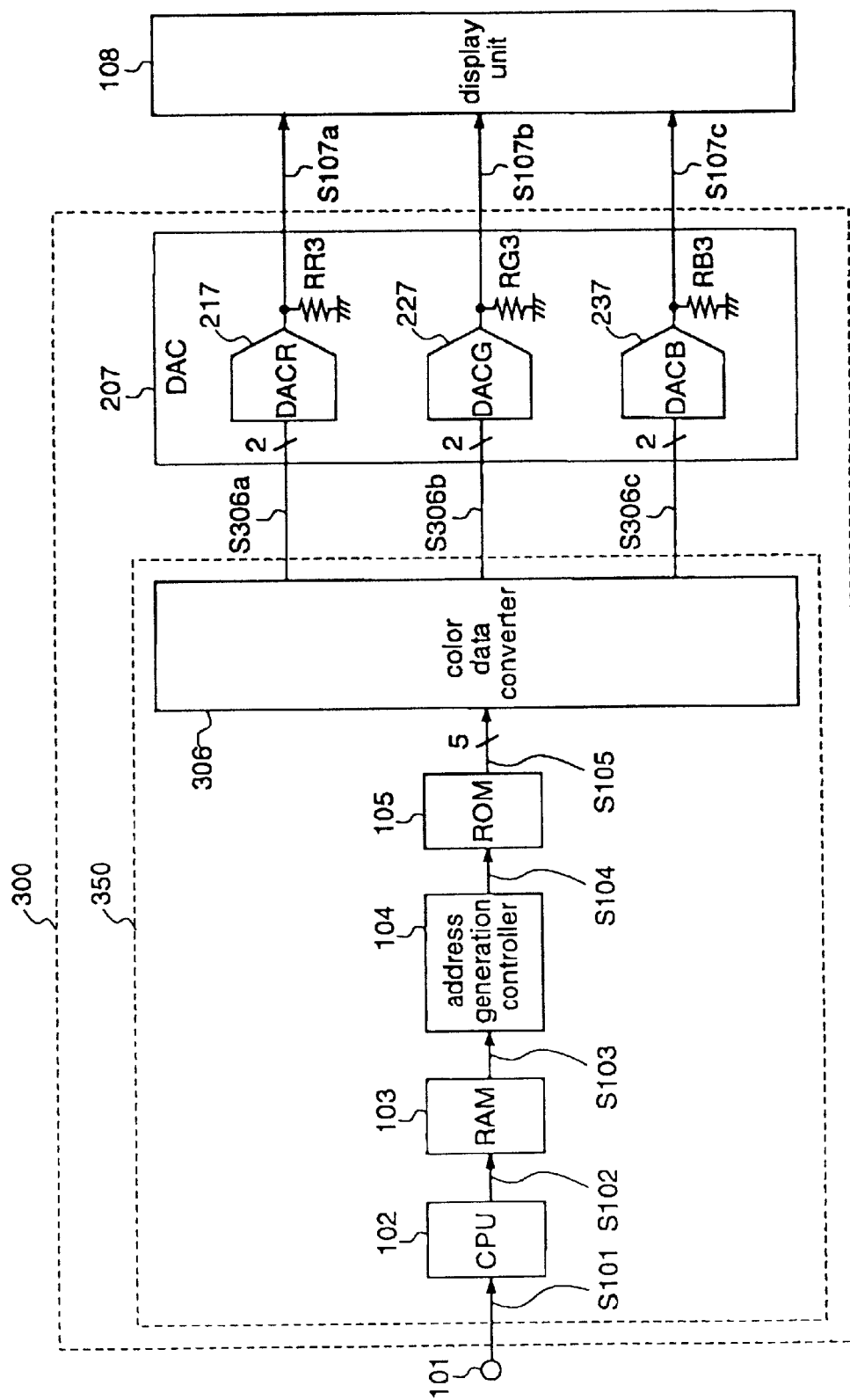
FIG. 3 is a block diagram illustrating the construction of the conventional display control apparatus.

FIG. 2 is a block diagram illustrating a display control apparatus 200 according to a second embodiment of the present invention. The display control apparatus 200 is identical to the display control apparatus 100 according to the first embodiment except that, in each of the output controllers 157a, 157b, and 157c, switches are placed between each of the resistors RR1, RG1, RB1 and the power supply $V_{DD}$ and between each of the resistors RR2, RG2, RB2 and the ground, and these switches can electrically connect or disconnect the respective resistors to/from the power supply $V_{DD}$ or the ground, according to control signals. In FIG. 2, the same reference numerals as those shown in FIG. 1 denote the same or corresponding parts. The output high impedance control circuit 157 of the display control apparatus 200 is provided with the output controllers 157a, 157b, and 157c. As in the display control apparatus of the first embodiment, the output controllers 157a, 157b, and 157c are provided with the tri-state buffers 117, 127, and 137, the resistors RR1, RG1, and RB1 connected to the outputs of the tri-state buffers 117, 127, and 137, and the resistors RR2, RG2, and RB2 connected to the outputs of the tri-state buffers 117, 127, and 137, respectively. Furthermore, the output controllers 157a, 157b, and 157c are provided with switches 117a, 127a, and 137a that can control the conducting states between the resistors RR1, RG1, RB1 and the power supply $V_{DD}$ according to a display period signal S112 as a control signal outputted from the CPU 102, and switches 117b, 127b, and 137a that can control the conducting states between the resistors RR2, RG2, RB2 and the ground according to the display period signal S112.

Hereinafter, a description will be given of the operation of the display control apparatus 200 so constructed. The operations of the same constituents as those described for the first embodiment are not repeatedly described.

When a display command S101, which instructs the display unit 108 to perform display, is applied to the display command input terminal 101, the CPU 102 outputs a display period signal S112 for setting the switches 117a, 127a, 137a, 117b, 127b, and 137b in the enable states. The respective switches 117a, 127a, 137a, 117b, 127b, and 137b go into the conducting states on the basis of the display period signal S112. Thereby, the respective output controllers 157a, 157b, and 157c output the display color data S107a, S107b, and S107c each having three output levels, on the basis of the inputted color signals and intermediate color control signals, whereby the data to be displayed are displayed by 27 colors on the display unit 108. In this way, the respective switches 117a, 127a, 137a, 117b, 127b, and 137b are in the conducting states while the color signals S106a, S106b, and S106c and the intermediate color control signals S109a, S109b, and S109c are input to the tri-state buffers 117, 127, and 137.

When a display command S101 instructing the display unit 108 to perform display is not applied to the display command input terminal 101 or when a display command S101 instructing the display unit 108 to stop the display is applied to the terminal 101, the CPU 102 generates no display code S102, and outputs a display period signal S112 for setting the switches 117a, 127a, 137a, 117b, 127b, and 137b in the disable states. The respective switches 117a, 127a, 137a, 117b, 127b, and 137b go into the non-conducting states on the basis of the display period signal S112. That is, the respective switches 117a, 127a, 137a, 117b, 127b, and 137b are in the non-conducting states while the color signals S106a, S106b, and S106c and the intermediate color control signals S109a, S109b, and S109c are not input to the tri-state buffers 117, 127, and 137. Therefore, no current flows from the power supply $V_{DD}$ through the resistors RR1, RG1, RB1 and the resistors RR2, RG2, RB2 during the period when there is no necessity of outputting the display color data to the display unit 108, whereby the current consumption is reduced.

As described above, according to the display control apparatus of the second embodiment, the respective switches 117a, 127a, 137a, 117b, 127b, and 137b are set in the non-conducting states during the non-display period when no color signals and no intermediate color signals are input to the tri-state buffers 117, 127, and 137, whereby the current consumption is reduced, in addition to the same effects as described for the first embodiment.

While in this second embodiment the display period signal S112 for controlling the respective switches 117a, 127a, 137a, 117b, 127b, and 137b is created by the CPU 102 on the basis of the display command S101, the display period signal S112 may be supplied directly from the outside to the respective switches 117a, 127a, 137a, 117b, 127b, and 137b according to the display command S101. Also in this case, the same effects as described for the first embodiment are achieved.

Furthermore, while in this second embodiment those switches are placed between the resistors RR1, RG1, RB1 and the power supply $V_{DD}$ and between the resistors RR2, RG2, RB2 and the ground, switches may be placed either between the resistors and the power supply $V_{DD}$ or between the resistors and the ground. For example, when switches are placed between the resistors RR1, RG1, RB1 and the power supply $V_{DD}$, the current flowing from the power supply $V_{DD}$ to the display unit 108 during the non-display period can be reduced. On the other hand, when switches are placed between the resistors RR2, RG2, RB2 and the ground, the current flowing from the display unit 108 toward the ground during the non-display period can be reduced, depending on the construction or the like of the display unit 108. Thereby, unnecessary current consumption can be reduced.

What is claimed is:

1. A display control apparatus comprising:

at least one output control unit, each output control unit comprising:

a tri-state buffer for receiving, as a signal input, a one-bit color signal, and for receiving, as a control input, a one-bit intermediate color control signal for controlling an intermediate color of the color signal, and setting an output of said buffer in one of three states comprising a state of outputting a first voltage, a state of outputting a second voltage, and a high impedance state, on a basis of the color signal and the intermediate color control signal;

a first resistor having an end connected to a power supply, and another end connected to the output of the tri-state buffer; and a second resistor having an end connected to the ground, and the other end connected to the output of the tri-state buffer.

2. The display control apparatus of claim 1, wherein each output control unit comprises an output control unit to which an R color signal is input, an output signal unit to which a G color signal is input, and an output control unit to which a B color signal is input.

3. The display control apparatus of claim 1, wherein each output control unit is for receiving intermediate color control signals that are independent of one another.

4. The display control apparatus of claim 1, wherein each output control unit further comprises a switch between a power supply and the first resistor, said switch for electrically connecting a power supply and the first resistor when the color signal and the intermediate color control signal are input to the output control unit, and for electrically disconnecting a power supply and the first resistor when the color signal and the intermediate color control signal are not input to the output control unit.

5. The display control apparatus of claim 1, wherein each output control unit further comprises a switch between a ground and the second resistor, said switch for electrically connecting a ground and the second resistor when the color signal and the intermediate color control signal are input to the output control unit, and for electrically disconnecting a ground and the second resistor when the color signal and the intermediate color control signal are not input to the output control unit.

* * * * *